United States Patent [19]

Divecha et al.

[11] Patent Number: 5,051,307

[45] Date of Patent: Sep. 24, 1991

[54] PROCESS FOR PRODUCING UNIFORM PROTECTIVE COATING OF SILVER METAL ON CARBON/CARBON COMPOSITES

[75] Inventors: Amarnath P. Divecha, Falls Church; William A. Ferrando, Arlington, both of Va.; Philip W. Hesse, Ellicott City, Md.; Subhash D. Karmarkar, Great Falls, Va.

[73] Assignee: The United States of America as represented by the Secretary of the Navy, Washington, D.C.

[21] Appl. No.: 548,332

[22] Filed: Jul. 3, 1990

[51] Int. Cl.$^5$ .......................... B32B 9/00; B05D 3/02
[52] U.S. Cl. .................................. 428/408; 427/229; 427/383.3
[58] Field of Search ................ 427/229, 383.3, 443.2; 428/408

[56] References Cited

U.S. PATENT DOCUMENTS

| | | | |
|---|---|---|---|
| 2,748,034 | 5/1956 | Bobal | 427/229 |
| 2,847,332 | 8/1958 | Ramadanoff | 428/408 |
| 3,294,572 | 12/1966 | Piccione | 427/229 |
| 4,240,830 | 12/1980 | Lee | 427/217 |
| 4,309,458 | 1/1982 | Kawasumi et al. | 427/217 |
| 4,980,005 | 12/1990 | Scollard | 156/92 |

Primary Examiner—Shrive Beck
Assistant Examiner—Terry J. Owens
Attorney, Agent, or Firm—Kenneth E. Walden; Roger D. Johnson

[57] ABSTRACT

A process for producing high temperature, oxidation resistant silver metal coatings on carbon/carbon composite structures by coating the carbon/carbon surfaces with molten $AgNO_3$ at a temperature above the melting point of $AgNO_3$ but below the decomposition temperature of $AgNO_3$, and then heating the resulting uniform coating of molten $AgNO_3$ at a temperature of from the decomposition temperature of $AgNO_3$ to about 700° C. to decompose the molten $AgNO_3$ and form a uniform coating of silver metal.

10 Claims, 1 Drawing Sheet

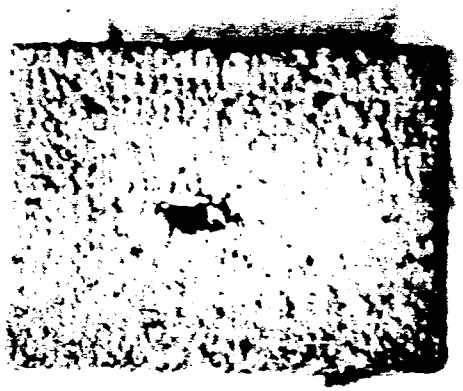

PROCESS FOR PRODUCING UNIFORM PROTECTIVE COATING OF SILVER METAL ON CARBON/CARBON COMPOSITES

BACKGROUND OF THE INVENTION

This invention relates to carbon composites and more particularly to protective coatings for carbon composites.

Carbon/Carbon (C/C) composites are extremely stable up to very high temperatures in an inert atmosphere, (e.g., argon, nitrogen) or vacuum. The C/C composites, however, have very poor resistance to oxidation in an oxidizing atmosphere (e.g., air) at high temperatures (e.g., ~ 800° C.). Protective coatings of SiC (by chemical vapor deposition), $SiO_2$, and even iridium have been tested. The major problems with these coatings are that the process temperatures are too high, or the coverage of the coating is incomplete, or the process destroys the integrity of the C/C composite material.

Therefore it would be desirable to provide protective coatings against oxidation for C/C composites which can be formed at lower temperatures, which will not damage the integrity of the C/C composite, and which will provide more complete protective coverage of the C/C composite.

SUMMARY OF THE INVENTION

Accordingly an object of this invention is to protect carbon/carbon composites against oxidation.

Another object of this invention is to provide a protective coating against oxidation which provides good coverage of the carbon/carbon composite surface.

A further object of this invention is to provide a protective coating against oxidation on carbon carbon composites by a process at lower temperatures.

Yet another object of this invention is to provide a protective coating against oxidation on carbon/carbon composites by a process which does not damage or destroy the carbon/carbon composites.

These and other objects of this invention area accomplished by (1) coating the surface of the carbon/carbon composite with molten $AgNO_3$ which wets the surfaces of the carbon/carbon composite and forms a uniform coating; and (2) decomposing the $AgNO_3$ to form a thin, uniform coating of silver metal on the surfaces of the carbon/carbon composite.

The process may be repeated until the desired thickening of silver metal coating is achieved.

BRIEF DESCRIPTION OF THE FIGURE

The figure is a photograph showing three silver-coated carbon-carbon composite samples which have been exposed in air for 15 hours at 700° C. (top), 800° C. (middle), and 900° C. (bottom). The figure is discussed in more detail in example 2.

DETAILED DESCRIPTION OF THE PREFERRED EMBODIMENT

This invention provides protective coatings for carbon/carbon composites which are designed for use in high temperature, oxidizing atmospheres. Carbon composites include graphite composites.

Molten $AgNO_3$ (m.p. 212° C.) is coated on to the exposed surfaces of the carbon/carbon composite. The $AgNO_3$ is applied at a temperature above the melting point of $AgNO_3$ (212°) but below the decomposition temperature of $AgNO_3$ (d. 444° C.). The carbon/carbon composite is heated in that temperature range to keep the $AgNO_3$ molten after it is applied. The molten $AgNO_3$ has excellent wetting characteristics and penetrates and conforms to every contour, pore, and asperity of the carbon/carbon composite.

The preferred method of applying the molten $AgNO_3$ coating is to dip or soak the carbon/carbon composite in a bath of molten $AgNO_3$. The molten $AgNO_3$ may also be sprayed, painted, or rolled on. Because of the excellent wetting characteristics of the molten $AgNO_3$, a uniform coating will be achieved by all of these methods.

Next, the carbon/carbon composite and molten $AgNO_3$ coating are heated at a temperature of preferably from the decomposition temperature of $AgNO_3$ to about 700° C. more preferably from 450 to 550° C., and still more preferably from 450 to 500° C., until the $AgNO_3$ (d. 444° C.) decomposes to form a thin uniform film of silver metal. The silver metal coated composite may then be cooled to room temperature.

The molten $AgNO_3$ coating and decomposition steps may be repeated as desired to produce thicker coatings. Because of the wetting ability of the molten $AgNO_3$, any porosity present in an under-layer of silver metal will be filled by the succeeding layer of silver metal. Protection against oxidation is improved with a thicker coat. The disadvantages are that the weight and expense of the carbon/carbon composite are also increased with a thicker layer.

Very thin coatings of silver metal are produced by soaking the carbon/carbon composite in a $AgNO_3$ solution and evaporating the solvent to deposit solid $AgNO_3$ on the surface of the composite. The composite and $AgNO_3$ are then heated at a temperature above the melting point of $AgNO_3$ but below the decomposition point of $AgNO_3$. The resulting molten $AgNO_3$ coats and wets the surface of the carbon/carbon composite. Next, the carbon/carbon composite and molten $AgNO_3$ coating are heated at a temperature of preferably from the decomposition temperature of $AgNO_3$ to about 700° C. more preferably from 450 to 550° C., and still more preferably from 450 to 500° C., until the $AgNO_3$ (d. 444° C.) decomposes to form a thin uniform film of silver metal. The silver metal coated composite may then be cooled to room temperature. The thickness of this thin silver metal coating can be varied by varying the concentration of the silver nitrate solution. A suitable solvent which (1) dissolves $AgNO_3$, (2) can be evaporated without leaving a residue, and (3) does not react with or damage the carbon/carbon composite is used in the $AgNO_3$ solution. Preferred solvents include distilled water ($AgNO_3$ solubility about 120 g/100ml at 0° C.) and ethylene glycol, $HOCH_2CH_2OH$, ($AgNO_3$ solubility about 75 g/100 ml), with ethylene glycol being more preferred. However, care must be taken in removing the ethylene glycol. The temperature should be kept below 75° C. and preferably should be in the range of from 50 to 65° C. At high temperatures the ethylene glycol acts as a fuel and may catch fire.

The general nature of the invention having been set forth, the following examples are presented as specific illustrations thereof. It will be understood that the invention is not limited to these specific examples but is susceptible to various modifications that will be recognized by one of ordinary skill in the art.

EXAMPLE 1

A flat carbon/carbon (C/C) composite with uniaxially oriented graphite was cut into two pieces approximately ½ inch square and weighed accurately. One of the pieces was treated with $AgNO_3$ by melting $AgNO_3$ over the C/C composite piece at approximately 225° C. As the $AgNO_3$ melted, it spontaneously and readily spread over the entire piece including the bottom. The effect may be described best by an analogy of water wetting and spreading over a hydrophyllic material.

The $AgNO_3$ coated sample and the as-received control sample piece where both placed in a furnace and heated to approximately 800° C. in air and held there for approximately 6 hours. During the heating process the $AgNO_3$ decomposes to form a uniform coating of silver metal. Upon cooling to room temperature the weights of each sample were measured. The results were as follows.

| Protected Sample | | Control Sample | |
|---|---|---|---|
| Uncoated weight: | 2.49 g | Initial weight: | 3.01 g |
| Coated weight: | 3.03 g | Weight after heat: | 0.25 g |
| Weight after heat: | 1.82 g | | |

Thus, the C/C composite material is protected from oxidation by the silver metal coating to a substantial extent. The silver metal conforms to every contour and asperity of the C/C composite surface. Because silver does not form carbides, there is no interaction between the C/C composite and the silver coating which would have resulted in a degradation of the C/C composite surface.

EXAMPLE 2

Four pieces of carbon-carbon composite material (K-Karb TM, Kaiser Aerotech, San Leandro, CA 94557) were cut and prepared in order to demonstrate further the capability of the protective silver coating against oxidation at elevated temperature in air. The pieces were cut from an 0.5 cm thick sheet of the material and measured approximately $0.5 \times 2.0 \times 1.5$ cm.

Samples 1, 2, and 3 were thoroughly soaked (immersed) in liquid $AgNO_3$ (>222° C.). Sample 4 remained uncoated and was used as a control. Direct geometrical computation of the thickness of the Ag coating on one of the samples yielded about 0.22 mm. Table 1 shows the relevant parameters of this test.

TABLE 1

| Sample # | Initial Wt. g | Ag Coated Wt. g | Air Exposure Time (hr) | temp(°) | Final Wt. (g) | Position in Figure |
|---|---|---|---|---|---|---|
| 1 | 2.76 | 5.48 | 15 | 700 | 3.39 | left |
| 2 | 2.90 | 5.60 | 15 | 800 | 3.55 | middle |
| 3 | 2.91 | 5.53 | 15 | 900 | 3.21 | right |
| 4 | 1.77 | uncoated control | 3 | 800 | 0.27 | — |

The degree of protection achieved by Ag coating is evident from the table 1. The figure is a photograph showing the three coated samples after exposure. The samples exposed in air at 700, 800, and 900° C., respectively, are shown from top to bottom. Examination of these indicated good bonding of the coating with the samples around their perimeter with loss of material occurring preferentially toward the centers.

Obviously, numerous modifications and variations of the present invention are possible in light of the above teachings. It is therefore to be understood that within the scope of the appended claims the invention may be practiced otherwise than as specifically described herein.

What is claimed is:

1. A process for producing high temperature, oxidation resistant coatings for carbon/carbon composites comprising:
    (1) coating a carbon/carbon composite structure designed for use at high temperatures in an oxidizing atmosphere with molten $AgNO_3$ at a temperature above the melting point of $AgNO_3$ out below the decomposition point of $AgNO_3$; and
    (2) decomposing the molten $AgNO_3$ at a temperature in the range of from the decomposition temperature of $AgNO_3$ to about 700° C. to produce a layer of silver metal.

2. The process of claim 1 wherein the temperature used to decompose the $AgNO_3$ in step (2) is from 450 to 550° C.

3. The process of claim 2 wherein the temperature used to decompose the $AgNO_3$ in step (2) is from 450 to 500° C.

4. The product produced by the process of claim 1.

5. A process for producing high temperature, oxidation resistant coatings for carbon/carbon composites comprising:
    (1) soaking a carbon/carbon composite structure designed for use at high temperatures in an oxidizing atmosphere in a $AgNO_3$ solution;
    (2) drying the carbon/carbon composite structure to deposit solid $AgNO_3$ on the surface of the carbon/carbon composite structure;
    (3) heating the $AgNO_3$-coated carbon/carbon composite structure at a temperature above the melting point of $AgNO_3$ but below the decomposition temperature of $AgNO_3$ until the $AgNO_3$ melts and forms a uniform coating over the surface of the carbon/carbon composite structure; and
    (4) heating the molten $AgNO_3$-coated carbon/carbon composite structure at a temperature in the range of from the decomposition temperature of $AgNO_3$ to about 700° C.

6. The process of claim 5 wherein the temperature used to decompose the $AgNO_3$ in step (4) is from 450 to 550° C.

7. The process of claim 6 wherein the temperature used to decompose the $AgNO_3$ in step (4) is from 450 to 500° C.

8. The process of claim 5 wherein the solvent used in the $AgNO_3$ solution is distilled water.

9. The process of claim 5 wherein the solvent used in the $AgNO_3$ solution is ethylene glycol.

10. The product produced by the process of claim 5.

* * * * *